United States Patent
Alriksson et al.

(10) Patent No.: US 10,292,076 B2
(45) Date of Patent: May 14, 2019

(54) NETWORK NODE AND A METHOD THEREIN FOR DETERMINING A MOBILITY CRITERION

(71) Applicant: Telefonaktiebolaget L M Ericsson (publ), Stockholm (SE)

(72) Inventors: Peter Alriksson, Horby (SE); Joakim Axmon, Kavlinge (SE); Torgny Palenius, Barseback (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/428,636

(22) PCT Filed: Mar. 2, 2015

(86) PCT No.: PCT/EP2015/054304
§ 371 (c)(1),
(2) Date: Mar. 16, 2015

(87) PCT Pub. No.: WO2016/138926
PCT Pub. Date: Sep. 9, 2016

(65) Prior Publication Data
US 2016/0381609 A1    Dec. 29, 2016

(51) Int. Cl.
*H04W 36/00*    (2009.01)
*H04W 36/08*    (2009.01)

(52) U.S. Cl.
CPC ... *H04W 36/0094* (2013.01); *H04W 36/0085* (2018.08); *H04W 36/08* (2013.01)

(58) Field of Classification Search
None
See application file for complete search history.

(56) References Cited

U.S. PATENT DOCUMENTS

2009/0028112 A1 * 1/2009 Attar ............... H04W 36/245
                                                    370/332
2014/0064253 A1   3/2014 Devasigamani et al.
(Continued)

FOREIGN PATENT DOCUMENTS

EP    2485543 A1    8/2012
EP    2 667 654 A1    11/2013
(Continued)

OTHER PUBLICATIONS

WO2014057441—included with Applicant provided IDS dated Jun. 4, 2015.*

(Continued)

*Primary Examiner* — Saba Tsegaye
(74) *Attorney, Agent, or Firm* — Leffler Intellectual Property Law, PLLC

(57) ABSTRACT

A method performed by a network node for determining a mobility criterion related to a wireless communications device in a wireless communications network. The network node obtains an information related to an UL propagation condition associated to the wireless communications device. The network node determines a measure of imbalance between the UL propagation condition and a DL propagation condition associated to the wireless communications device. The measure of imbalance is based on the information related to the UL propagation condition. The network node determines the mobility criterion based on the measure of imbalance between the UL propagation condition and the DL propagation condition.

13 Claims, 5 Drawing Sheets

(56) References Cited

U.S. PATENT DOCUMENTS

2014/0133448 A1    5/2014  Xu et al.
2014/0313953 A1   10/2014  Zhang et al.
2014/0335868 A1   11/2014  Kubota et al.
2015/0141027 A1*   5/2015  Tsui .................... H04W 52/243
                                              455/452.1
2015/0341840 A1*  11/2015  Lee ...................... H04W 24/08
                                              455/437

FOREIGN PATENT DOCUMENTS

WO    2011/072440 A1    6/2011
WO     2014057441 A2    4/2014

OTHER PUBLICATIONS

PCT International Search Report, dated Nov. 20, 2015, in connection with International Application No. PCT/EP2015/054304, all pages.

PCT Written Opinion, dated Nov. 20, 2015, in connection with International Application No. PCT/EP2015/054304, all pages.

Wu, H. et al. "Proactive Scan: Fast Handoff with Smart Triggers for 802.11 Wireless LAN" Proceedings of IEEE 26th International Conference on Computer Communications, May 1, 2007, pp. 749,757, ISBN: 978-1-4244-1047-7.

* cited by examiner

NETWORK NODE AND A METHOD THEREIN FOR DETERMINING A MOBILITY CRITERION

TECHNICAL FIELD

Embodiments herein relate to a network node and a method therein. In particular they relate to mobility criteria in a wireless communications network.

BACKGROUND

In a typical cellular wireless communications network, communication devices, also known as mobile stations and/or user equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation (3G) mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for a fourth generation (4G) mobile communication system, i.e. the Evolved Packet System (EPS), have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

A Wireless Local Area Network (WLAN) is a wireless computer network that links two or more wireless devices using a wireless distribution method within a limited area such as a home, school, computer laboratory, or office building. This gives the wireless devices the ability to move around within a local coverage area and still be connected to the network, and may provide a connection to the wider Internet. Most modern WLANs are based on IEEE 802.11 standards, marketed under the Wi-Fi brand name.

Mobility is a central aspect of many wireless communications networks. The wireless communication network supports mobility of a wireless communication device, i.e. service continuity of the wireless communications device, e.g. by transferring a connection between the wireless communications network and the wireless communications device from one cell to another cell or from one base station or access point to another base station or access point.

Mobility criteria comprise for example when to activate inter-Radio Access Technology (RAT) and inter-frequency measurements and when to hand over the wireless communications device to another base station. Mobility criteria may be set conservatively to ensure good connectivity for all wireless communications devices. This will however lead to unnecessary mobility measures, e.g. inter-RAT/frequency measurements and hand over, for many wireless communications devices. These unnecessary mobility measures will in turn degrade both the performance of the wireless communications network and the performance of the user equipments. The performance of the user equipment will suffer especially if a wireless communications device is unnecessarily handed over to a RAT with lower performance than the current RAT, e.g. handover from a 4G network to a 3G network.

SUMMARY

An object of embodiments herein is to improve the determination of a mobility criterion in wireless communications networks.

According to a first aspect of embodiments herein, the object is achieved by a method performed by a network node for determining a mobility criterion related to a wireless communications device in a wireless communications network.

The network node obtains an information related to an UL propagation condition associated to the wireless communications device.

The network node further determines a measure of imbalance between the UL propagation condition and a DL propagation condition associated to the wireless communications device. The measure of imbalance is based on the information related to the UL propagation condition.

The network node determines the mobility criterion based on the measure of imbalance between the UL propagation condition and the DL propagation condition.

According to a second aspect of embodiments herein, the object is achieved by a network node for determining a mobility criterion related to a wireless communications device in a wireless communications network.

The network node is configured to obtain an information related to an UL propagation condition associated to the wireless communications device.

The network node is further configured to determine a measure of imbalance between the UL propagation condition and a DL propagation condition associated to the wireless communications device. The measure of imbalance is based on the information related to the UL propagation condition.

The network node is further configured to determine the mobility criterion based on the measure of imbalance between the UL propagation condition and the DL propagation condition.

According to a third aspect of embodiments herein, the object is achieved by a computer program, comprising instructions that, when executed on at least one processor, cause the at least one processor to carry out the method above.

According to a fourth aspect of embodiments herein, the object is achieved by a carrier comprising the computer program mentioned above, wherein the carrier is one of an electronic signal, optical signal, radio signal, or computer readable storage medium.

Since the network node determines the mobility criterion based on the measure of imbalance between the UL propagation condition and the DL propagation condition an improved mobility criterion is obtained as compared to determining the mobility criterion based on the DL propagation condition only. The improved mobility criterion improves the performance of the network node, the wireless communications network and the wireless communications device.

An advantage with embodiments herein is that they avoid performance degradations related to a large deviation between an uplink and a downlink link performance, e.g. due to a large path loss imbalance. Therefore, wireless communications devices that experience large deviation between the uplink and the downlink link performance are able to perform handover to another cell in order to maintain a reliable uplink connection while other wireless communications devices without imbalance problems are not subjected to unnecessary mobility measures.

Thus embodiments herein provide performance enhancements related to the network node, the wireless communications network and the wireless communications device.

BRIEF DESCRIPTION OF THE DRAWINGS

Examples of embodiments herein are described in more detail with reference to attached drawings in which.

DETAILED DESCRIPTION

Figure 1:
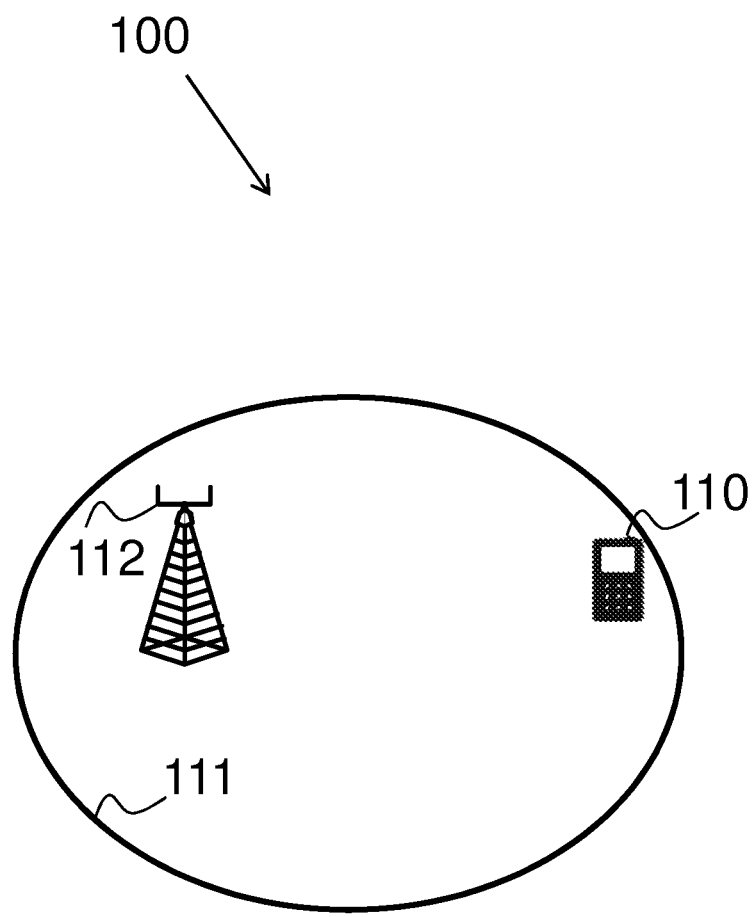
FIG. 1 is a schematic block diagram illustrating a wireless communications network.

As part of developing embodiments herein, a problem will first be identified and discussed. The problem will be exemplified using a cellular wireless communications network using 4G or LTE technology. However, the same or similar problem also arises in other cellular wireless communications networks, such as 2G and 3G, and in non-cellular wireless communications network, such as Bluetooth.

Mobility criteria in current wireless communications networks are typically based on downlink measurements of absolute received signal power, signal to noise ratio, signal to interference ratio or signal to noise and interference ratio. Mobility criteria include for example when to activate inter-RAT/frequency measurements and when to hand over the wireless communications device to another base station.

In coverage limited scenarios, i.e. scenarios where the serving cell becomes weaker and weaker and there are no intra-frequency neighbors to hand over to, the wireless communications device needs to inform the base station about the situation. The base station may then either instruct the wireless communications device to perform inter-frequency or/and inter-RAT measurements to identify potential neighbor cells to hand over to or blindly hand over or redirect the wireless communications device to another frequency or RAT.

In a 4G, i.e. LTE, system, typically the base station, i.e. the eNB, will configure the wireless communications device, i.e. the UE, with an A2 event that is triggered when the serving cell's Reference Signal Received Power (RSRP) goes below a threshold. Based on this event, the base station may either instruct the wireless communications device to initiate inter-frequency and/or inter-RAT measurements or blindly hand over or redirect the wireless communications device to another frequency or RAT. In either case the event must be sent while the wireless communications device still may maintain a connection to the eNB both in the DL and in the UL. Thus the A2 threshold should be set as low as possible to avoid unnecessary mobility measures, but high enough for the wireless communications device to be able to maintain a connection to the eNB.

If downlink and uplink path loss are approximately equal and thus uplink and downlink coverage overlap, using downlink measurements as mobility criterion in general works fine. If, however, the uplink path loss is much larger than the downlink path loss, a wireless communications device may experience relatively good downlink conditions and thus not fulfill the mobility criterion, at the same time as it is unable to reach the base station with its uplink messages.

Large uplink-downlink path loss imbalance may occur due to a number of reasons, for example:
Uplink and downlink on different carrier frequencies
Poor antenna matching
Fewer or different antennas used for uplink than for downlink To guarantee that the wireless communications device is able to reach the base station with its uplink messages the mobility criterion may be set conservatively to ensure good connectivity for all wireless communications devices. This will however lead to unnecessary mobility measures, e.g. inter-RAT or inter-frequency measurements and hand over, for wireless communications devices that are able to reach the base station with its uplink messages. These unnecessary mobility measures will in turn degrade both the performance of the wireless communications network and the performance of the user equipments. The performance of the user equipment will suffer especially if a wireless communications device is unnecessarily handed over to a RAT with lower performance than the current RAT, e.g. handover from a 4G network to a 3G network.

In embodiments herein, the base station may adapt the mobility criterion based on uplink information to compensate for large uplink-downlink path loss imbalance. Uplink information may for example comprise power control commands, code rate and UL BLock Error Rate (BLER), or a combination thereof.

Typically, in LTE UL power control for the UE comprises an open-loop and a closed-loop part. The open-loop part measures DL path loss and sets UL output power so that a given desired received power at the eNB is expected to be achieved. The closed-loop part consists of power control commands from the eNB. In case the received power of the UL signal does not match the desired received power due to uplink-downlink path loss imbalance, the eNB will instruct the UE to change its output power using these power control commands.

Embodiments herein are not limited to wireless communications networks using LTE technology. Embodiments herein are also applicable to 2G/3G cellular networks and also possible further "5G" networks as well. Furthermore, embodiments herein may also be used with non-cellular systems, like WLAN and Bluetooth. The corresponding HO event discussed for cellular networks below may in this case be exchanged for corresponding current and future mobility functionality in such short range wireless communication networks.

Embodiments herein relate to wireless communication networks in general. FIG. 1 is a schematic overview depicting a wireless communications network 100 also known as radio communications network, a telecommunications network or similar. The wireless communications network 100 comprises one or more Radio Access Networks (RAN) and one or more Core Networks (CN). The wireless communications network 100 may use a number of different technologies, such as Long Term Evolution (LTE), LTE-Advanced, Wideband Code Division Multiple Access (WCDMA), Global System for Mobile communications/ Enhanced Data rate for GSM Evolution (GSM/EDGE), Worldwide Interoperability for Microwave Access (Wi-Max), or Ultra Mobile Broadband (UMB), just to mention a few possible implementations. The wireless communications network 100 is exemplified herein as an LTE network.

In the wireless communications network 100, a wireless communications device 110, communicates via a RAN to one or more CN. It should be understood by the skilled in the art that "wireless communication device" is a non-limiting term which means any mobile station, wireless device, wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

The wireless communications network 100 covers a geographical area which may be divided into cell areas, e.g. a cell 111 being served by a network node 112. The network node 112 may be a base station. The network node 112 may also be referred to as a radio base station and e.g. a NodeB, an evolved Node B (eNB, eNode B), a base transceiver station, Access Point Base Station, base station router, or any other network unit capable of communicating with the wireless communication device 110.

A cell is a geographical area where radio coverage is provided by radio base station equipment at a base station site or at remote locations in Remote Radio Units (RRU) or Remote Radio Heads (RRH) or Remote Antenna Units (RAU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell uniquely in the whole wireless communications network 100 is also broadcasted in the cell. The network node 112 communicates over the air or radio interface operating on radio frequencies with the wireless communication device 110 within radio range of the network node 112. The wireless communication device 110 transmits data over the radio interface to the network node 112 in Uplink (UL) transmissions and the network node 112 transmits data over an air or radio interface to the wireless communication device 110 in Downlink (DL) transmissions.

It should be noted that the following embodiments are not mutually exclusive. Components from one embodiment may be tacitly assumed to be present in another embodiment and it will be obvious to a person skilled in the art how those components may be used in the other exemplary embodiments.

Actions for determining a mobility criterion related to the wireless communications device 110 in the wireless communications network 100 according to embodiments herein will now be described in relation to FIG. 2, FIG. 3 and FIG. 4.

Figure 2:
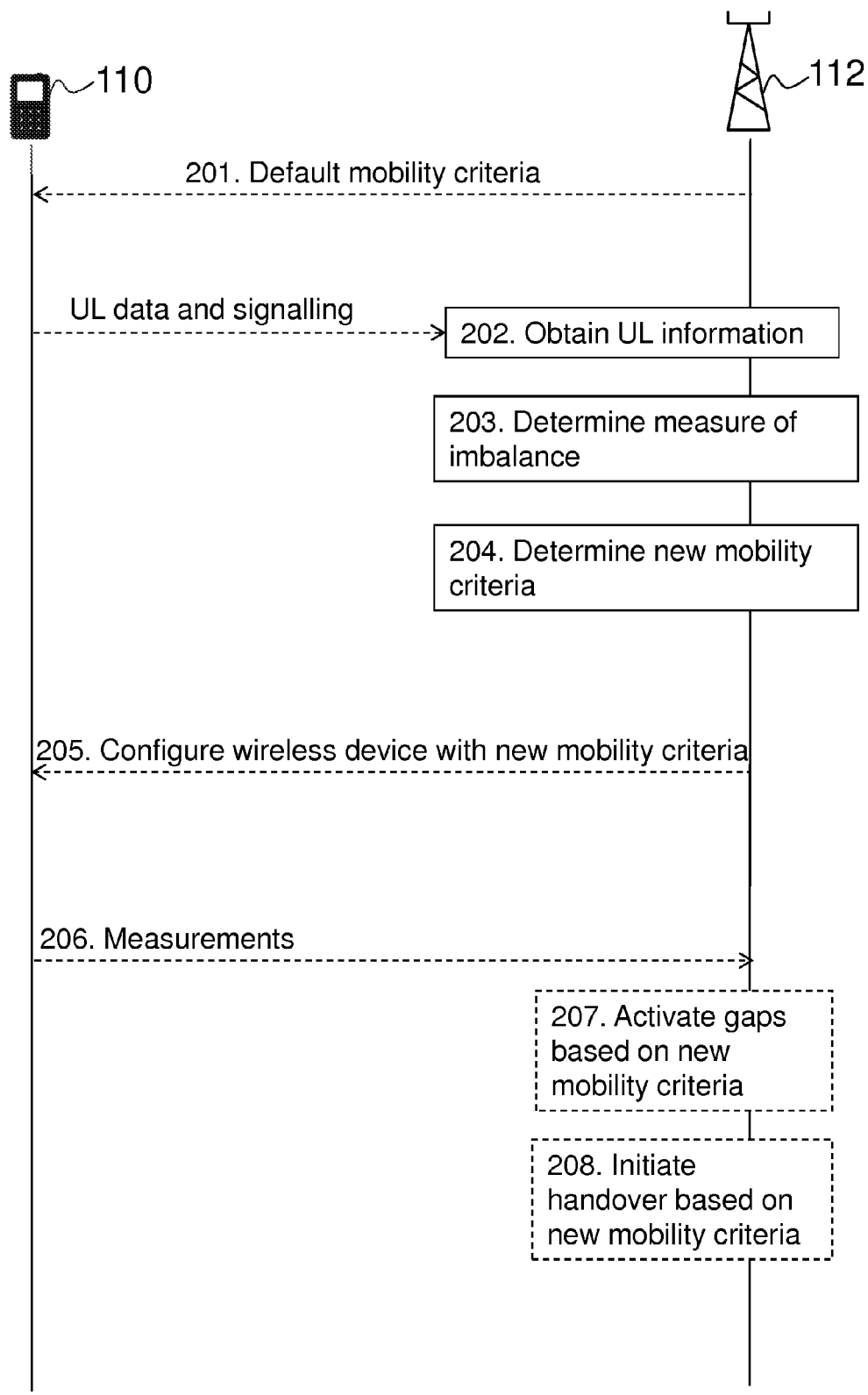
FIG. 2 is a combined signalling diagram and flow chart illustrating embodiments of a method in a wireless communications network.

FIG. 2 is a combined signalling diagram and flow chart that describes a method for determining the mobility criterion according to embodiments herein.

Figure 3:
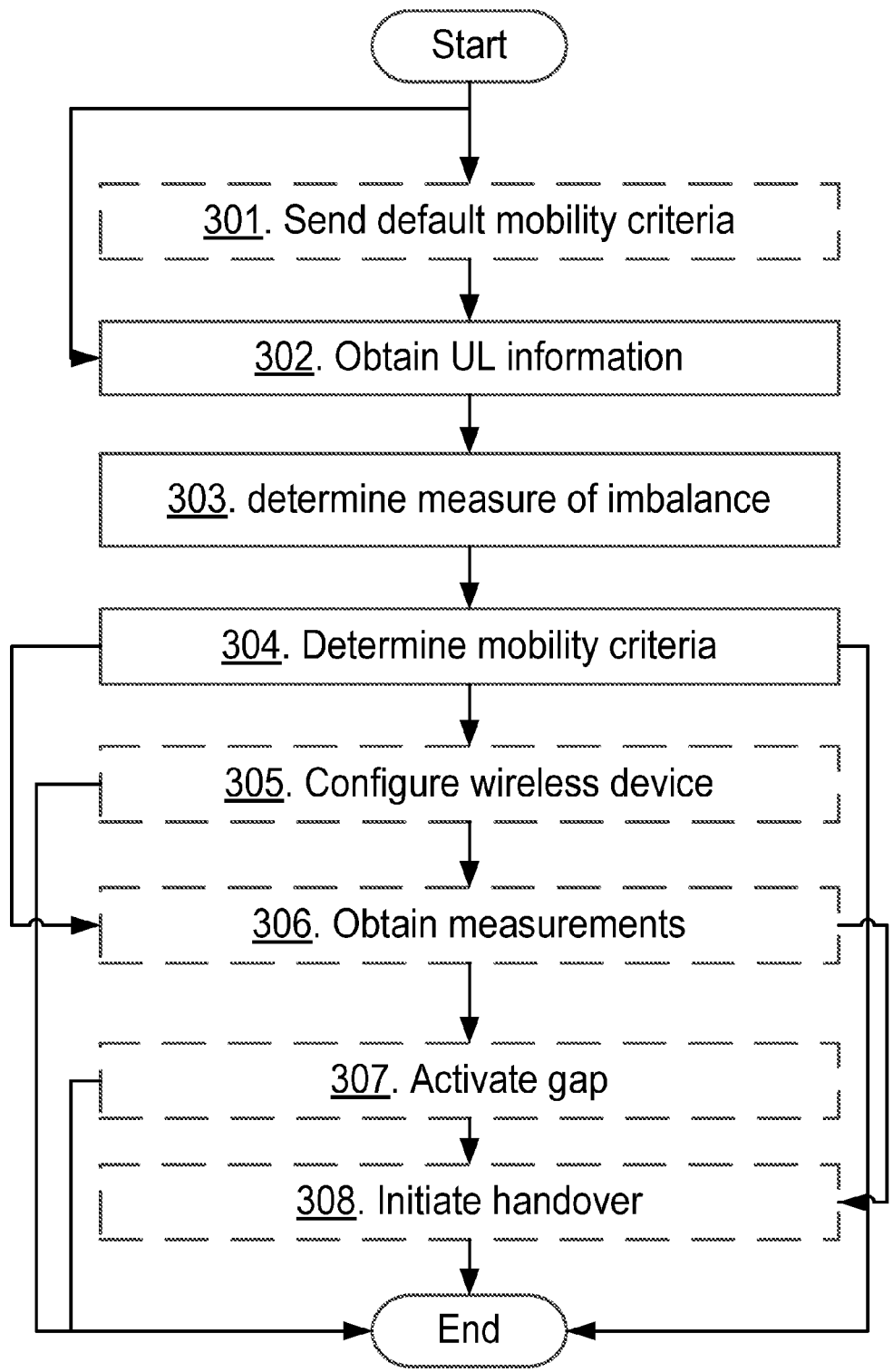
FIG. 3 is a flow chart illustrating embodiments of a method performed by a network node.

FIG. 3 is a flowchart that describes a method performed by the network node 112 for determining the mobility criterion according to embodiments herein.

Figure 4:
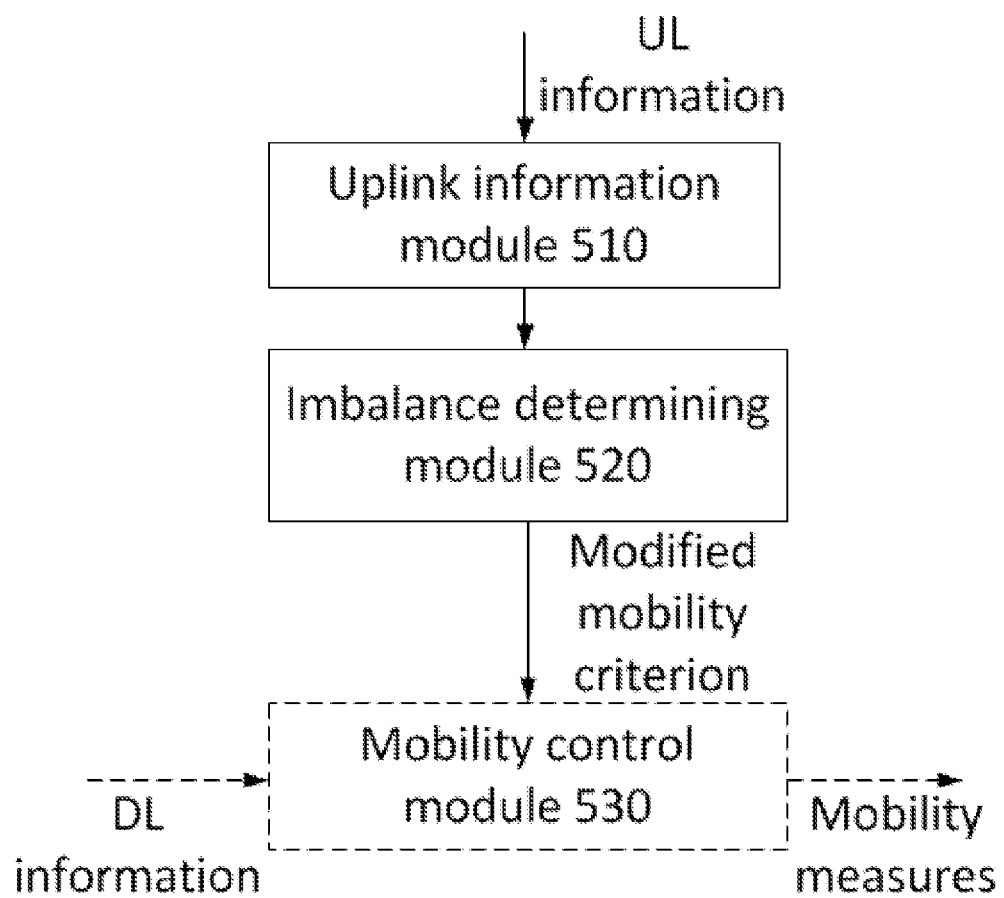
FIG. 4 is a combined flow chart and schematic block diagram illustrating embodiments of a network node and a method performed therein.

FIG. 4 is a combined flow chart and block diagram that describes the network node 112 and a method therein for determining the mobility criterion according to embodiments herein.

In a typical scenario the wireless communications device 110 moves around in the wireless communications network 100. To support mobility of the wireless communications device 110 in the wireless communications network 100 the network node 112 and the wireless communications device 110 may each perform actions related to mobility. For example, as the wireless communications device 110 moves away from the network node 112, the UL link performance or the DL link performance between the wireless communications device 110 and the network node 112 may degrade such that eventually this link performance becomes worse than a link performance of a link between the wireless communications device 110 and another network node.

Action 201, 301

Initially the network node 112 may send default mobility criteria to the wireless communications device 110. The default mobility criteria may for example be based on DL information gathered from the wireless communications device 110.

As mentioned above, default mobility criteria are typically based on downlink measurements of absolute received signal power, signal to noise ratio, signal to interference ratio or signal to noise and interference ratio. The default mobility criteria include for example when to activate inter-RAT/frequency measurements and when to hand over the wireless communications device to another base station.

Mobility criteria may also comprise measurement events, i.e. criteria on DL signals that will trigger the wireless communications device 110 to report a measurement value to the network node 112.

All of the information in the mobility criteria is not necessarily sent to the wireless communications device 110. For example, in current LTE, the wireless communications device 110 is only configured with measurement reporting. Gap activation and hand over is ordered by the network node 112. However, in the future the wireless communications device 110 may take more autonomous decisions regarding measurements and/or hand over, so gap activation and/or hand over may be part of what is sent to the wireless communications device 110 in the mobility criteria.

Action 202, 302

The network node 112 then obtains an information related to an UL propagation condition associated to the wireless communications device 110.

The information related to the UL propagation condition may comprise information related to an UL path loss.

The information related to the UL propagation condition may further comprise information about any one or more out of: a power control command, a code rate, a rank and a measure of an UL link performance.

In some embodiments the measure of the UL link performance is an UL BLock Error Rate (BLER).

An uplink information module 510 in the network node 112 may perform this action, as illustrated in FIG. 4.

In some embodiments the network node 112, e.g. by means of the Uplink information module 510, collects UL information, e.g. power control commands, e.g. accumulated power control commands, and UL link performance sent to the wireless communications device 110. The accumulated power control commands in LTE is a measure of how bad the wireless communications device 110 estimates the UL path loss based on DL path loss measurements. If the accumulated power control commands are positive it means that the wireless communications device 110 is underestimating the UL path loss and thus the UL path loss is larger than the downlink path loss.

Different network vendors may have different approaches on how to handle transmissions in the uplink, and particular implementations may for instance configure the wireless communications device 110 with increased robustness, e.g. reduced code rate, for the UL transmissions before increasing the Transmit (Tx) power of the wireless communications device 110. For such implementations one may also take into account the code rate for UL and DL transmissions, respectively, along with BLER targets to detect the imbalance.

Yet another approach may take into account e.g. Tx power per successfully transmitted information bit in UL and DL allocations, respectively, along with BLER targets to get a measure of whether it is harder to transmit on the UL than the DL. BLER targets are needed since if there are different targets for UL and DL, then more retransmissions are anticipated for one of them and this has to be compensated for in the detection metrics.

Action 203, 303

The network node 112 determines a measure of imbalance between the UL propagation condition and a DL propagation condition associated to the wireless communications device. The measure of imbalance is based on the information related to the UL propagation condition.

Determining the measure of imbalance may comprise determining a measure of imbalance between the UL path loss and a DL path loss.

An imbalance determining module 520 in the network node 112 may perform this action, as illustrated in FIG. 4. The Imbalance determining module 520 may evaluate the UL information to determine the measure of uplink-downlink path loss imbalance.

Action 204, 304

The network node 112 determines the mobility criterion based on the measure of imbalance between the UL propagation condition and the DL propagation condition.

Since the network node 112 determines the mobility criterion based on the measure of imbalance between the UL propagation condition and the DL propagation condition, the mobility criterion is improved as compared with a mobility criterion that is determined based on DL propagation conditions only. In this way it is possible to avoid performance degradations related to a large deviation between the uplink and the downlink link performance, e.g. due to a large path loss imbalance. Therefore, wireless communications devices that experience large deviation between the uplink and the downlink link performance are able to perform handover to another cell in order to maintain a reliable uplink connection while other wireless communications devices without imbalance problems are not subjected to unnecessary mobility measures, such as handover.

The mobility criterion may be related to measurement reporting, such as event triggered measurement reporting.

In some embodiments determining the mobility criterion comprises determining a threshold related to event triggered measurement reporting.

Based on the measure of imbalance the Imbalance determining module 520 may configure a mobility control module 530 with a modified mobility criterion, as illustrated in FIG. 4. The modified mobility criterion may be more conservative than the default mobility criterion based only on the DL propagation condition. For example, the network node 112 may configure the wireless communications device 110 with a higher threshold than the default threshold for an event, such as the A2 event. The increase in threshold may correspond to the determined imbalance. This will allow the network node 112 to take mobility measures before the wireless communications device 110 has lost its UL connection, without the need to apply this margin for every wireless communications device.

Action 205, 305

The network node 112 may now take appropriate actions or measures related to mobility based on the mobility criterion. The mobility control module 530 in the network node 112 may perform such action or measures, as illustrated in FIG. 4.

For example, the network node 112 may configure the wireless communications device 110 based on the mobility criterion.

In some embodiments the network node 112 configures the wireless communications device 110 with the threshold related to event triggered measurement reporting mentioned above in action 204, 304.

Configuring the wireless communications device 110 may further comprise configuring a gap related to any one or more out of: an inter-frequency signal measurement and an inter-RAT signal measurement. The gap may also be referred to as a measurement gap. The gap, or the measurement gap, may be defined as a small gap in time during which no transmission and reception on a radio frequency used for communication between the wireless communications device 110 and the network node 112 is performed. Since there is no signal transmission and reception on that radio frequency during the gap, the wireless communications device 110 may perform signal quality measurements at the inter-frequency signal and/or the inter-RAT signal during the gap.

When the communications device 110 has been configured based on the mobility criterion the communications device 110 may act based on the mobility criterion. Such actions may comprise measurements during a configured gap, triggering of events and measurement reporting to the wireless communications network 100.

Action 206, 306

In some embodiments the network node 112 obtains information regarding measurements performed by the wireless communications device 110, e.g. measurement reports, in order to be able to control the mobility of the wireless communications device 110. The measurements may be based on the mobility criterion, which in turn is based on the measure of imbalance between the UL propagation condition and the DL propagation condition.

Action 207, 307

When the network node 112 has received the information regarding measurements performed by the wireless communications device 110 the network node 112 may also take appropriate actions or measures related to mobility indirectly based on the mobility criterion, e.g. based on the measurement reports sent from the wireless communications device 110. Such actions may comprise to activate the gap for the wireless communications device 110.

Action 208, 308

Other measures related to mobility may comprise initiating handover. In other words, in some embodiments the network node 112 initiates handover of the wireless communications device 110 based on the mobility criterion.

In embodiments herein the network node 112, e.g. an eNodeB, determines whether there is an imbalance in the DL propagation channel as experienced by the wireless communications device 110, e.g. a UE, and the UL propagation channel as experienced by the network node 112. In case such imbalance is determined, the network node 112 compensates the imbalance by for instance adjusting applicable mobility event detection thresholds such as the A2 threshold, to allow the wireless communications device 110 to be handed over to a new cell before it goes out of UL coverage.

Figure 5:
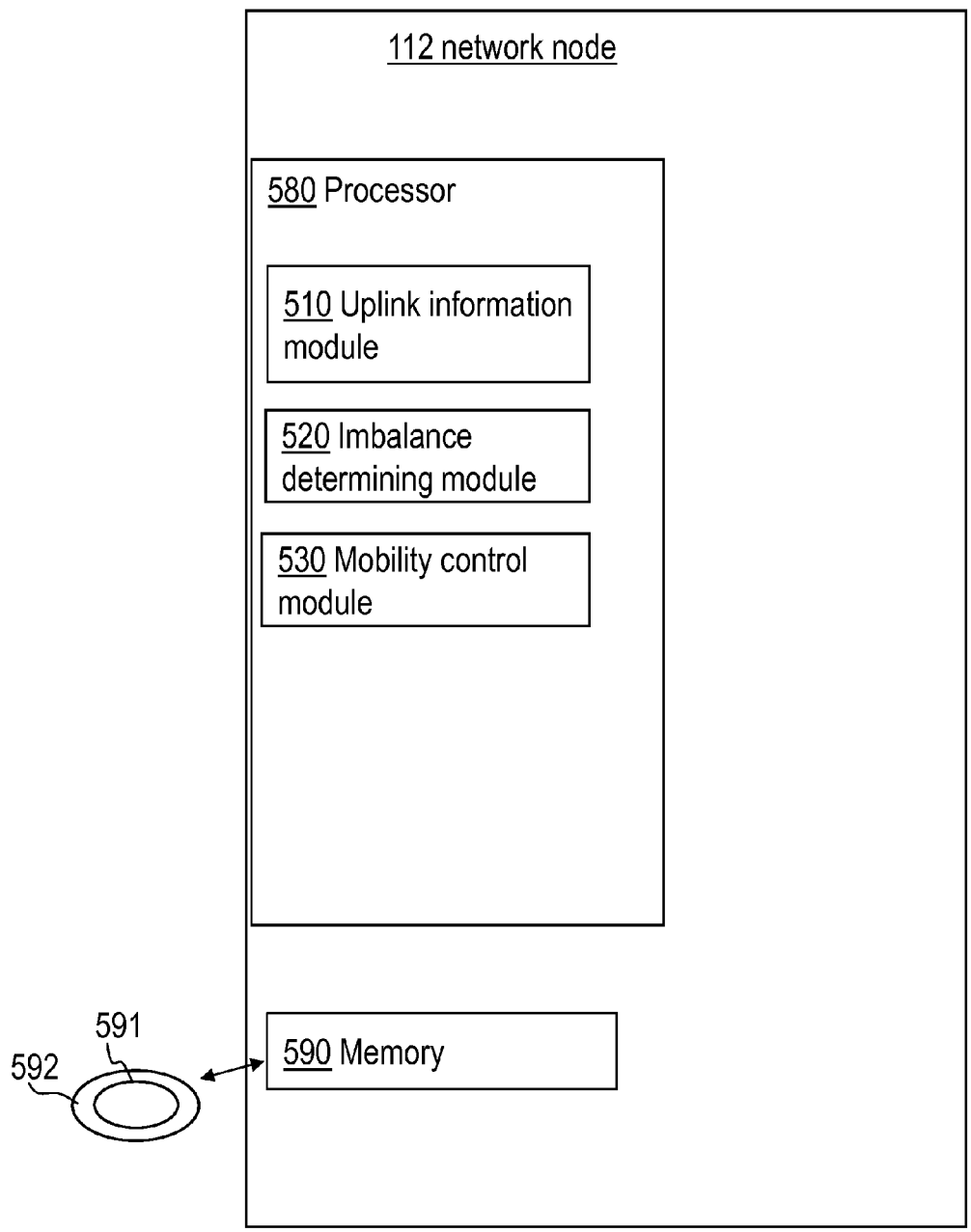
FIG. 5 is a schematic block diagram illustrating embodiments of a network node.

To perform the method actions for determining the mobility criterion related to the wireless communications device 110 in the wireless communications network 100 described above in relation to FIG. 2 and FIG. 3, the network node 112 comprises the following arrangement depicted in FIG. 5.

The network node 112 is configured to, e.g. by means of the uplink information module 510 configured to, obtain the information related to an UL propagation condition associated to the wireless communications device 110.

The information related to the UL propagation condition may comprise information related to an UL path loss.

The information related to the UL propagation condition may further comprise information about any one or more out of: the power control command, the code rate, the rank and the measure of an UL link performance.

In some embodiments the measure of the UL link performance is an UL BLER.

The obtaining module 510 may be implemented by a processor 580 in the network node 112.

The network node 112 is further configured to, e.g. by means of the imbalance determining module 520 configured to, determine the measure of imbalance between the UL propagation condition and the DL propagation condition associated to the wireless communications device 110. The measure of imbalance is based on the information related to the UL propagation condition.

The measure of imbalance may comprise the measure of imbalance between the UL path loss and the DL path loss.

The imbalance determining module 520 may be implemented by the processor 580 in the network node 112.

The network node 112 is further configured to, e.g. by means of the imbalance determining module 520 configured to, determine the mobility criterion based on the measure of imbalance between the UL propagation condition and the DL propagation condition.

The mobility criterion may be related to measurement reporting.

In some embodiments the mobility criterion comprises the threshold related to event triggered measurement reporting.

The mobility control module 530 may be implemented by the processor 580 in the network node 112.

The network node 112 may be further configured to, e.g. by means of the mobility control module 530 configured to, configure the wireless communications device 110 based on the mobility criterion.

The network node 112 may further be configured to configure the wireless communications device 110 with the gap related to any one or more out of: an inter-frequency signal measurement and an inter-RAT signal measurement.

In some embodiments the network node 112 is further configured to, e.g. by means of the mobility control module 530 configured to, initiate handover of the wireless communications device 110 based on the mobility criterion.

Those skilled in the art will also appreciate that the uplink information module 510, the imbalance determining module 520 and the mobility control module 530 described above may refer to a combination of analogue and digital circuits, and/or one or more processors configured with software and/or firmware, e.g. stored in a memory 590 that when executed by the one or more processors such as the processor 580 perform as described above. One or more of these processors, as well as the other digital hardware, may be included in a single ASIC, or several processors and various digital hardware may be distributed among several separate components, whether individually packaged or assembled into a SoC.

The network node 112 may further be configured to, e.g. by means of the memory 590 configured to, store for example default mobility criteria, UL information, DL information, measures of imbalance, new mobility criteria, measurements sent from the wireless communications device, gaps and information related to gaps, information related to handover, and configurations, schedulings and applications etc. to perform the methods herein when being executed in the network node 112. The memory 590 comprises one or more memory units.

The embodiments herein determining the mobility criterion related to the wireless communications device 110 in the wireless communications network 100 may be implemented through one or more processors, such as the processor 580 in the network node 112 depicted in FIG. 5, together with a computer program 591, comprising instructions that, when executed on the processor 580, cause the processor 580 to carry out the functions and actions of the embodiments herein.

The computer program 591 mentioned above may also be provided as a computer program product for instance in the form of a carrier 592 comprising the computer program 591 for performing the embodiments herein when being loaded into the network node 112. Such a carrier may be an electronic signal, optical signal, radio signal, or a computer readable storage medium, e.g. in the form of a CD ROM disc.

It is however feasible with other data carriers such as a memory stick. The computer program code may furthermore be provided as pure program code on a server and downloaded to the network node 112.

Thus, the methods according to the embodiments described herein for the network node 112 may be implemented by means of a computer program product, comprising instructions, i.e., software code portions, which, when executed on at least one processor, cause the at least one processor to carry out the actions described herein, as performed by the network node 112. The computer program product may be stored on a computer-readable storage medium. The computer-readable storage medium, having stored there on the computer program, may comprise the instructions which, when executed on at least one processor, cause the at least one processor to carry out the actions described herein, as performed by the network node 112. In some embodiments, the computer-readable storage medium may be a non-transitory computer-readable storage medium.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first network node and a second network node should be considered to be non-limiting and does in particular not imply a certain hierarchical relation between the two.

The invention claimed is:

1. A method performed by a network node for determining a mobility criterion for supporting service continuity of a wireless communications device in a wireless communications network, the method comprising:
    obtaining an information related to an uplink (UL) propagation condition including a UL path loss associated to the wireless communications device;
    determining a deviation between the UL path loss and a downlink (DL) path loss associated to the wireless communications device;
    determining the mobility criterion based on the deviation between the UL path loss and the DL path loss; and
    initiating handover of the wireless communications device between cells or network nodes based on the mobility criterion,
    wherein measurement reports are provided by the wireless communication device based on the mobility criterion.

2. The method according to claim 1, wherein the information related to the UL propagation condition further comprises information about any one or more of: a power control command, a code rate, and a measure of an UL link performance.

3. The method according to claim 2, wherein the measure of the UL link performance is an UL BLock Error Rate (BLER).

4. The method according to claim 1, wherein event triggered measurement reports are provided by the wireless communication device based on a threshold included in the mobility criterion.

5. The method according to claim 1, further comprising configuring the wireless communications device based on the mobility criterion.

6. The method according to claim 5, wherein configuring the wireless communications device comprises configuring a gap in time for performing any one or more of: an inter-frequency signal measurement and an inter-Radio Access Technology (inter-RAT) signal measurement, during which gap there is no transmission and reception with the network node.

7. A network node for determining a mobility criterion for supporting service continuity of a wireless communications device in a wireless communications network, the network node is configured to:
    obtain an information related to an uplink (UL) propagation condition including a UL path loss associated to the wireless communications device;
    determine a deviation between the UL path loss and a downlink (DL) path loss associated to the wireless communications device;
    determine the mobility criterion based on the deviation between the UL path loss and the DL path loss; and
    initiate handover of the wireless communications device between cells or network nodes based on the mobility criterion,
    wherein measurement reports are provided by the wireless communication device based on the mobility criterion.

8. The network node according to claim 7, wherein the information related to the UL propagation condition further comprises information about any one or more of: a power control command, a code rate, and a measure of an UL link performance.

9. The network node according to claim 8, wherein the measure of the UL link performance is an UL BLock Error Rate (BLER).

10. The network node according to claim 7, wherein event triggered measurement reports are provided by the wireless communication device based on a threshold included in the mobility criterion.

11. The network node according to claim 7, further configured to configure the wireless communications device based on the mobility criterion.

12. The network node according to claim 11, further configured to configure the wireless communications device with a gap in time for performing any one or more of: an inter-frequency signal measurement and an inter-Radio Access Technology (inter-RAT) signal measurement, during which gap there is no transmission and reception with the network node.

13. A nontransitory computer readable storage medium comprising instructions that, when executed on at least one processor of a network node, cause the at least one processor to carry out a method for determining a mobility criterion for supporting service continuity of a wireless communications device in a wireless communications network, the method comprising:
    obtaining an information related to an uplink (UL) propagation condition including a UL path loss associated to the wireless communications device;
    determining a deviation between the UL path loss and a downlink (DL) path loss associated to the wireless communications device;
    determining the mobility criterion based on the deviation between the UL path loss and the DL path loss; and
    initiating handover of the wireless communications device between cells or network nodes based on the mobility criterion, wherein measurement reports are provided by the wireless communication device based on the mobility criterion.

* * * * *

UNITED STATES PATENT AND TRADEMARK OFFICE
CERTIFICATE OF CORRECTION

PATENT NO. : 10,292,076 B2
APPLICATION NO. : 14/428636
DATED : May 14, 2019
INVENTOR(S) : Alriksson et al.

Page 1 of 1

It is certified that error appears in the above-identified patent and that said Letters Patent is hereby corrected as shown below:

On the Title Page

In Item (72), under "Inventors", in Column 1, Line 1, delete "Horby (SE);" and insert
-- Hörby (SE); --, therefor.

In Item (72), under "Inventors", in Column 1, Line 2, delete "Kavlinge (SE);" and insert
-- Kävlinge (SE); --, therefor.

In Item (72), under "Inventors", in Column 1, Line 3, delete "Barseback (SE);" and insert
-- Barsebäck (SE); --, therefor.

In the Specification

In Column 4, Line 46, delete "downlink" and insert -- downlink. --, therefor.

Signed and Sealed this
Twentieth Day of August, 2019

Andrei Iancu
*Director of the United States Patent and Trademark Office*